April 22, 1924.
M. V. CROKER
1,491,032
INSULATING COUPLING
Filed Aug. 12, 1921
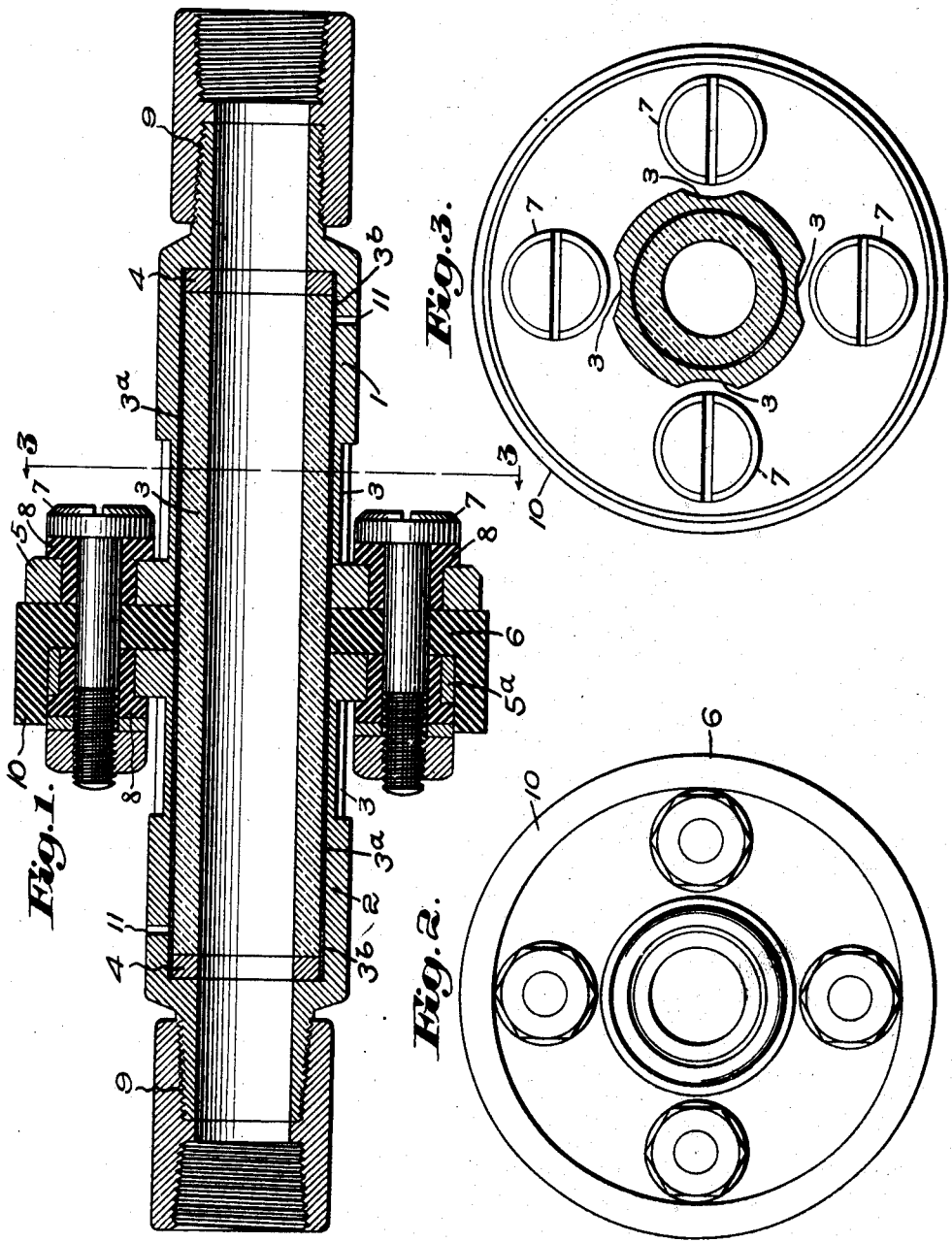
Inventor:
Mark V. Croker Patented Apr. 22, 1924.

1,491,032

UNITED STATES PATENT OFFICE.

MARK V. CROKER, OF NEWTON UPPER FALLS, MASSACHUSETTS.

INSULATING COUPLING.

Application filed August 12, 1921. Serial No. 491,802.

*To all whom it may concern:*

Be it known that I, MARK V. CROKER, a citizen of the United States, and a resident of Newton Upper Falls, in the county of Middlesex and State of Massachusetts, have invented an Improvement in Insulating Couplings, of which the following description, in connection with the accompanying drawings, is a specification, like characters on the drawings representing like parts.

This invention relates to insulating couplings for water, gas or other fluid conductors and its object is to provide a simple, sanitary and durable coupling for insulating one section of the conductor from another.

In the accompanying drawings wherein I have shown merely for the purposes of illustration one embodiment of my invention:

Fig. 1 is a longitudinal section of the coupling;

Fig. 2 is a left-hand end elevation thereof; and

Fig. 3 is a section taken on the line 3—3 of Fig. 1.

The present embodiment of the invention comprises coupling sections 1 and 2 preferably composed of metal adapted to be secured together to form the completed coupling. The means herein employed for securing said coupling sections together includes flanges 5 and 5ª formed respectively upon said coupling sections, these flanges being separated by an insulating disk 6 against opposite faces of which said flanges are secured by appropriate means such as bolts 7, 7. The flanges 5 and 5ª being metal, it is desirable that insulating material be interposed between said bolts and the metal of said flanges to prevent electric currents from passing from one coupling section to the other. Hence the holes in the flanges 5 and 5ª through which said bolts pass are made larger than the bolts and in these holes are inserted flanged insulating bushings 8, the flanges whereof, being arranged against the outer or non-abutting faces of said flanges, insure the insulation of the heads and nuts of said bolts from the flanges 5 and 5ª.

Couplings of the character illustrated herein may be used in connection with horizontal pipes or with vertical pipes but in either case condensation will at times form upon the exterior surfaces of the coupling. Hence it is desirable that the insulating disk 6 be formed slightly larger than the flanges 5 and 5ª so that any moisture collecting on one or the other will settle on said disk and drip from the same instead of spreading to the adjacent section and in so doing provide a conductor for an electric current.

When the coupling is placed horizontally as shown in Fig. 1, the moisture forming thereon will, by reason of the larger diameter of the disk 6 drip from its periphery but when the same coupling is placed vertically as it sometimes is, further provision for preventing the spreading of moisture from said disk to the lower coupling is provided in the nature of a downwardly extending flange 10 formed at the margin of said disk and entirely surrounding and overlapping the lower flange 5ª. In addition to the insulating disk 6 other insulating means have been provided consisting of a bushing or lining 3 preferably extending into each of the sections 1 and 2, the opening or passage through said bushing being substantially equal in diameter to the passages through the coupling sections 1 and 2, thus providing a continuous uninterrupted uniform conduit for the fluid. Obviously the lining or bushing 3 may be of any suitable insulating material. In the present example however it is desirable that this be constructed of a sanitary substance such as porcelain and being entirely surrounded by the coupling sections will be amply protected thereby so as to prevent its being broken.

To properly seal the ends of the bushing or lining 3 within the said coupling sections and thus render the same water-tight, resilient washers 4, 4 are inserted so that, as said flanges 5 and 5ª are drawn up tightly against the disk 6, said washers 4 will be compressed and completely close the space between said lining or bushing and said coupling sections.

In view of the breakable nature of said bushing 3 the recesses within said coupling sections within which said bushing is arranged are slightly larger, providing an annular space 3ª entirely surrounding the bushing. In the present example the ends of said bushings are separated from the coupling sections by resilient packing 3ᵇ constituting cushions for the ends of said porcelain bushings.

The coupling sections 1 and 2 are provided with perforations 11, 11 extending from the annular space 3ª to the atmosphere to permit the escape of fluid from said space 3ª should any leak develop through the spaces occupied by the washers 4, thus to give warning of the existence of such a leak.

The ends of the coupling sections 1 and 2 may be formed in any suitable manner to engage other sections of pipe or, as herein shown, said sections may be screw-threaded in the usual manner as at 9, 9 to engage internally threaded sections or couplings, examples of which are shown in the drawings.

Having thus described one illustrative embodiment of my invention, I desire it to be understood that although specific terms are employed, they are used in a generic and descriptive sense and not for purposes of limitation, the scope of the invention being set forth in the following claims.

Claims.

1. An insulating pipe coupling comprising, in combination, a pair of coupling sections, means to secure said sections together, and an insulating lining for said sections, and means cooperating with the end portions of said lining for yieldingly supporting it with its intermediate portion out of contact with the walls of said sections.

2. An insulating pipe coupling comprising, in combination, a pair of flanged coupling sections, an insulating bushing for said sections, means for so mounting said bushing as to permit relative lateral movement of said sections, means to secure said flanges together, and means to insulate said securing means from said flanges.

3. An insulating pipe coupling comprising, in combination, a pair of coupling sections, a sanitary bushing for said sections, supported on said sections at points relatively distant from the adjoining ends of said sections, means to secure said sections together and means to insulate said securing means from said sections.

4. An insulating pipe coupling comprising, in combination, a pair of flanged coupling sections, an insulating member interposed between said flanges, means to secure said flanges together, a lining for said coupling sections, and means for supporting said lining at its ends out of contact with the walls of said sections.

5. An insulating pipe coupling comprising, in combination, a pair of coupling sections, means to secure said sections together, and a porcelain lining for said sections, so supported by said sections as to permit relative lateral movement therebetween.

6. An insulating coupling comprising, in combination, a pair of coupling sections, means to secure said coupling sections together, an insulating bushing arranged within and extending from one of said coupling sections to the other, packing interposed between the ends of said bushing and said coupling section, and means including ports formed in said coupling sections to give warning of an internal leak by permitting fluid to escape.

7. A pipe coupling comprising, in combination, a pair of metallic coupling sections, means to secure said sections together, means for insulating said securing means from said section, a relatively brittle bushing extending from one to the other of said coupling sections, and cushioning means interposed between the end portions of said bushing and said coupling sections to prevent breakage of said bushing and to seal the joints between said bushing and coupling sections.

8. An insulating coupling comprising, in combination, a pair of coupling sections insulated one from the other, an insulating bushing extending from one section to the other adapted to seal the joint between said coupling sections, and packing arranged between the outer marginal portions of said bushing and said coupling sections to provide an annular space between said bushing and said sections.

9. An insulating coupling comprising, in combination, a pair of coupling sections insulated one from the other, and bushing 3, washers 4 and packing 3ᵇ at the end portions only of said bushing adapted to seal the joint between said sections and to separate the portions of said sections and bushing intermediate said packings.

10. An insulating coupling comprising, in combination, a pair of coupling sections insulated one from the other, a bushing arranged within and in spaced relation to said coupling sections, and packing means interposed between the end portions only of said bushing and said coupling sections.

11. An insulating coupling comprising metallic coupling sections, means for securing said coupling sections together in insulated relation, a bushing arranged within said sections and separated therefrom by an annular space, packing interposed between the end portions of said bushing and said sections to seal the joints, and ports for permitting fluid to escape from said annular space in case said joints develop leaks.

In testimony whereof, I have signed my name to this specification.

MARK V. CROKER.